US008144213B2

(12) United States Patent
Fuchikami et al.

(10) Patent No.: US 8,144,213 B2
(45) Date of Patent: Mar. 27, 2012

(54) IMAGING DEVICE, INTEGRATED CIRCUIT, AND IMAGING METHOD FOR ENCODING IMAGE FRAMES BASED ON DETECTED FLICKER OF A LIGHT SOURCE

(75) Inventors: Ryuji Fuchikami, Fukuoka (JP); Ikuo Fuchigami, Fukuoka (JP); Tomoo Kimura, Fukuoka (JP)

(73) Assignee: Panasonic Corporation, Osaka (JP)

( * ) Notice: Subject to any disclaimer, the term of this patent is extended or adjusted under 35 U.S.C. 154(b) by 321 days.

(21) Appl. No.: 12/663,948

(22) PCT Filed: Oct. 23, 2008

(86) PCT No.: PCT/JP2008/002998
§ 371 (c)(1),
(2), (4) Date: Jan. 4, 2010

(87) PCT Pub. No.: WO2009/098741
PCT Pub. Date: Aug. 13, 2009

(65) Prior Publication Data
US 2010/0157093 A1 Jun. 24, 2010

(30) Foreign Application Priority Data
Feb. 4, 2008 (JP) .................. 2008-023594

(51) Int. Cl.
*H04N 9/73* (2006.01)
(52) U.S. Cl. ............. 348/226.1; 348/222.1; 375/240.25; 375/240.26
(58) Field of Classification Search ............... 348/222.1, 348/226.1; 375/240.25, 240.26
See application file for complete search history.

(56) References Cited

U.S. PATENT DOCUMENTS

| 6,266,370 | B1 | 7/2001 | Kamikura et al. |
| 6,456,658 | B2 | 9/2002 | Kamikura et al. |
| 6,934,331 | B2 | 8/2005 | Kamikura et al. |
| 2001/0014125 | A1 | 8/2001 | Endo |
| 2006/0055823 | A1 | 3/2006 | Kinoshita et al. |
| 2006/0133501 | A1* | 6/2006 | Lee et al. ............. 375/240.16 |
| 2007/0291840 | A1 | 12/2007 | Tsuru |

FOREIGN PATENT DOCUMENTS

| JP | 4-309076 | 10/1992 |
| JP | 10-136385 | 5/1998 |
| JP | 2001-231045 | 8/2001 |
| JP | 2004-222228 | 8/2004 |
| JP | 2006-121585 | 5/2006 |
| JP | 2007-97219 | 4/2007 |
| JP | 2007-202026 | 8/2007 |

OTHER PUBLICATIONS

International Search Report issued Jan. 13, 2009 in International (PCT) Application No. PCT/JP2008/002998.

* cited by examiner

*Primary Examiner* — Nelson D. Hernández Hernández
(74) *Attorney, Agent, or Firm* — Wenderoth, Lind & Ponack, L.L.P.

(57) ABSTRACT

A frame brightness detecting unit 15 detects a frame brightness value of each of a plurality of image frames. A flicker spectrum detecting unit 16 detects, from the frame brightness values of 512 frames, spectrum values at frequencies, such as 100 Hz, 200 Hz, and 300 Hz. A brightness estimating unit 17 estimates a brightens value of a light source from the spectrum values. An encoding unit 18 uses a reciprocal of the estimated brightens value to determine a reference frame. The encoding unit 18 also uses the reciprocal in an evaluation function for motion vector estimation. The image frame is encoded using the motion vector.

6 Claims, 12 Drawing Sheets

IMAGING DEVICE, INTEGRATED CIRCUIT, AND IMAGING METHOD FOR ENCODING IMAGE FRAMES BASED ON DETECTED FLICKER OF A LIGHT SOURCE

TECHNICAL FIELD

The present invention relates to a technology for encoding images captured at high speed in the presence of flicker.

BACKGROUND ART

In video encoding according to, for example, the MPEG (Moving Picture Experts Group) standards, the evaluation function used in motion estimation is the sum of absolute difference of brightness values between so-called "macroblocks". One macroblock refers to a rectangular area of a specific size. In the case where the size of a macroblock is 1×m, the sum of absolute difference SAD is given by Equation 1 below.

$$SAD(n', x', y') = \sum_{i=0}^{l} \sum_{j=0}^{m} |f_n(x+i, y+j) - f_{n-n'}(x+x'+i, y+y'+j)|$$ [Equation 1]

Note that the notation | | represents an absolute value. Further, $f_n(x, y)$ represents the brightness value at the coordinates (x, y) on the image frame having the frame number n (i.e., the image frame to be encoded), whereas $f_{n-n'}(x, y)$ represents the brightness value at the coordinates (x, y) on the image frame having the frame number "n−n'" (i.e., the reference frame).

In the motion estimation, a combination of n', x', and y' which results in the smallest sum of absolute difference SAD is searched to determine the reference frame and to estimate the motion vector. In a method such as MPEG-4 AVC (H.264), the value of n' may be designated arbitrarily to some extent. In a method such as MPEG-4 Simple Profile, the value of n' is fixed to "1".

The brightness value of the light source at the time of image capturing may differ between the image frame having the frame number n and the image frame having the frame number "n−n'". In such a case, the sum of absolute difference given by Equation 1 may become minimum between the image frames that happen to be close to each other in the brightness values irrespectively of the move of objects appearing in the image frames, which leads to decrease the compression ratio.

In one technology suggested for removing fluorescent flicker, quadratic or higher order spectrum analysis is conducted on an image captured by an imaging unit and then the image is corrected (see Patent Literature 1, for example). The overview of the suggested technology is described with reference to FIG. 10.

An imaging device 100 operates as follows. First, an imaging unit 101 constructed of a CMOS (Complementary Metal Oxide Semiconductor) image sensor captures images. A brightness detecting unit 102 measures the brightness of each captured image on a line-by-line basis. A flicker spectrum detecting unit 103 analyzes the frequency components of the brightness values using the Fourier transform to extract fluorescent flicker components, thereby estimating the waveform representing the fluorescent flicker. Based on the estimated waveform representing the fluorescent flicker, a correction coefficient generating unit 104 generates such a brightness correction coefficient that would eliminate the fluorescent flicker components. A gain adjustment unit 105 adjusts the gain of the captured image based on the brightness correction coefficient to correct the brightness. Although not specifically designed for high-speed image capturing, the imaging device 100 is enabled to perform brightness correction more accurately, by addressing the deviation in image capturing timing among pixels, which is a problem inherent to CMOS image sensors, and estimating the flicker spectrum covering high frequency components.

Further, in a technology suggested for video encoding in consideration of the change of the light source brightness between image frames, the brightness of the reference frame is adjusted to match the brightness value of the image frame to be encoded, prior to the motion estimation (see Patent Literature 2, for example). The overview of the suggested technology is described with reference to FIG. 11.

An imaging device 200 operates as follows. First, an imaging unit 201 captures an image and records the captured image into an input frame recording unit 202. A gain detection unit 208 detects the difference in brightness between the image frame held in the input frame recording unit 202 and a reference frame held in a reference frame recording unit 207. A gain adjustment unit 209 adjusts the brightness of the reference frame based on the detected brightness difference. A motion estimation unit 203 performs motion estimation between the image frame to be encoded and the adjusted reference frame. An encoding unit 204 encodes a signal acquired as a result of the motion estimation to store encoded data in a recording unit 205. Further, a decoding unit 206 decodes the encoded data to obtain a new reference frame and stores the reference frame in the reference frame recording unit 207. In the above described manner, the imaging device 200 is enabled to maintain high compression ratio, even if the brightness value among image frames varies under the influence of fluorescent flicker, for example.

In one technology belonging to the state of the art relating to parallelizing video encoding, a plurality of encoding units are employed to operate in parallel (see Patent Literature 3, for example). The overview of this technology is described with reference to FIG. 12. An imaging device shown in FIG. 12 operates as follows. First, an imaging unit 301 captures a video and a distribution unit 302 distributes the video by in frames among encoding units 303, 304, and 305. The encoding units 303, 304, and 305 encode the received frames and output encoded data to a concatenating unit 306 where the respective pieces of encoded data are combined and stored in a recording unit 307. This technology is effective to improve the encoding speed and thus useful in such applications as high-speed image capturing, which requires high encoding capability.

Patent Literature

Patent Literature 1: JP Patent Application Publication No. 2004-222228 (Page 33, and FIG. 4)
Patent Literature 2: JP Patent Application Publication No. 2001-231045 (Page 10 and FIG. 1)
Patent Literature 3: JP Patent Application Publication No. 2007-202026 (Page 14 and FIG. 1)

DISCLOSURE OF INVENTION

Technical Problem

However, the following should be noted regarding high-speed image capturing. That is, the frame rate at which image frames are captured may be higher than the frequency of fluorescent flicker. In such a case, the fluctuations in brightness caused by fluorescent flicker affect the image frames captured, without being convolved. For this reason, if the gain adjustment is applied according to the above-described technology for removing fluorescent flicker, the S/N ratio is caused to greatly differ between image frames. With the S/N ratio being different from one image frame to another, the video encoding efficiency is reduced.

Further, the following should be noted regarding the above-mentioned technology for encoding video images in consideration of the change in the light source brightness between image frames. That is, since the brightness correction is performed between image frames, it cannot be determined whether the brightness difference between the image frames is induced by the changes occurred within the captured images per se or by the fluorescent flicker. In the case where there is no fluorescent flicker and the difference between the image frames is large simply because the changes in the images is large, this technology leads to an adverse effect of reducing the compression ratio.

In order to address the problems noted above, the present invention aims to provide an imaging device, an integrated circuit, and an imaging method each capable of maintaining a high compression ratio when encoding a video captured in the presence of fluorescent flicker and maintaining a compression ratio comparable to a conventional technology when encoding a video captured in a flicker-free environment.

Technical Solution

In order to achieve the above aim, one aspect of the present invention provides an imaging device that includes: an imaging unit; a detecting unit operable to detect a time waveform indicating flicker of a light source; an estimating unit operable to estimate, for each of a plurality of image frames and based on a result of the detection by the detecting unit, a brightness value of the light source as of a time at which the image frame is captured by the imaging unit; a determining unit operable to determine, based on the estimated brightness values of the light source, one or more encoding parameters to be used in encoding of a current image frame to be encoded; and an encoding unit operable to encode the current image frame based on the encoding parameters determined by the determining unit.

Another aspect of the present invention provides an integrated circuit that includes: a detecting unit operable to detect a time waveform indicating flicker of a light source; an estimating unit operable to estimate, for each of a plurality of image frames and based on a result of the detection by the detecting unit, a brightness value of the light source as of a time at which the image frame is captured by an imaging unit; a determining unit operable to determine, based on the estimated brightness values of the light source, one or more encoding parameters to be used in encoding of a current image frame to be encoded; and an encoding unit operable to encode the current image frame based on the encoding parameters determined by the determining unit.

Yet another aspect of the present invention provides an imaging method that includes: image capturing; detecting a time waveform indicating flicker of a light source; estimating, for each of a plurality of image frames and based on a result of the detection in said detecting, a brightness value of the light source as of a time at which the image frame is captured in said image capturing; determining, based on the estimated brightness values of the light source, one or more encoding parameters to be used in encoding of a current image frame to be encoded; and encoding the current image frame based on the encoding parameters determined in said determining.

Advantageous Effects

According to each of the imaging device, integrated circuit, and imaging method described above, the time waveform representing flicker of the light source is detected. Accordingly, for each captured image, the brightness produced by the light source at the time when the image frame is captured is estimated. The one or more encoding parameter are then determined based on the estimated brightness values, and image frames are sequentially encoded based on the thus determined encoding parameters. By virtue of this, the effective encoding is ensured even if the video to be encoded is captured in the presence of fluorescent flicker. In addition, even if the video to be encoded is captured in no fluorescent flicker environment, the compression ratio is maintained at the level comparable to the level that is conventionally ensured.

In the imaging device, the encoding parameter may be a reference frame to be used in motion estimation. The encoding unit may be operable to estimate a motion vector between the current image frame and the reference frame that is determined as the encoding parameter by the determining unit.

According to the configuration described above, the reference frame is determined based on the estimated brightness value of the light source. Consequently, an image frame appropriate in view of the change of the light source brightness is used as the reference frame.

In the imaging device, the determining unit may be operable to determine, from among a plurality of candidate reference frames, the reference frame having an estimated brightness value closest to the estimated brightness value of the light source as of the time at which the current image frame to be encoded is captured.

According to the configuration described above, the candidate reference frame used as the reference frame is ensured to be the one having the estimated brightness value close to the estimated brightness value of the light source as of the time at which the image frame to be encoded is captured. Consequently, the image quality is improved.

In the imaging device, the determining unit may be operable to determine the reference frame having a largest estimated brightness value of the light source from among a plurality of candidate reference frames.

According to the configuration described above, the candidate reference frame with a high S/N ratio is used as the reference frame. Consequently, the encoding efficiency is improved.

In the imaging device, the encoding parameters may be coefficients for correcting brightness values of the current image frame and the reference frame that are used in an evaluation function for motion estimation. The encoding unit may be operable to encode the current image frame by performing motion estimation using the coefficients of the current image frame and the reference that are determined as the encoding parameters by the determining unit.

According to the configuration described above, the coefficient of the evaluation function is determined based on the estimated brightness value of the light source. Consequently, the motion vector is accurately estimated, even if the light source brightness varies.

In the imaging device, the encoding unit may include: a plurality of sub-encoding units operable to perform encoding in parallel; and a distributing unit operable to output the current image frame to one of the sub-encoding units according to the encoding parameter determined by the determining unit. The determining unit may be operable to determine, as the encoding parameter, one of the sub-encoding units to encode the current image frame.

According to the configuration described above, video encoding is effectively performed by a plurality of encoding units in parallel, even if the brightness of light source varies.

EXPLANATION OF REFERENCE

1 Imaging Device
2 CCD Camera Module
3 Image Processing Unit
4 DRAM
5 Memory Card
6 Input Frame Storage Area
7a-7d Reference Frame Storage Area
11 Processor
12 DRAM Control Unit
13 Memory Card Control Unit
14 Image Input Unit
15 Frame Brightness Detecting Unit
16 Flicker Spectrum Detecting Unit
17 Brightness Estimating Unit
18 Coding Unit
19 Internal Bus
31 Motion Estimation Unit
32 Difference Unit
33 DCT Unit
34 Quantization Unit
35 Variable-Length Coding Unit
36 Inverse Quantization Unit
37 IDCT Unit

BEST MODE FOR CARRYING OUT THE INVENTION

The following now describes embodiments of the present invention with reference to the drawings. In the present appli-cation, the term "coding parameter(s)" refers to item(s) that can be set or selected for encoding processes. Note that image correction processing such as gain adjustment is to change the images to be encoded in substance. Such image correction parameters for substantially changing the images to be encoded do not fall within the scope of the term "coding parameter(s)" used in the present application.

First Embodiment

The following describes a first embodiment of the present invention with reference to the drawings. In the present embodiment, the encoding parameters refer to a reference frame used in the motion estimation and also to coefficients $G_n$ and $G_{n-n'}$ appearing in the evaluation function given by Equation 2 shown below and used in the motion estimation. Note that the first to third embodiments are described on premise that each imaging device is used in regions where the power frequency is either 50 Hz or 60 Hz.

<Structure of Imaging Device>

Figure 1:
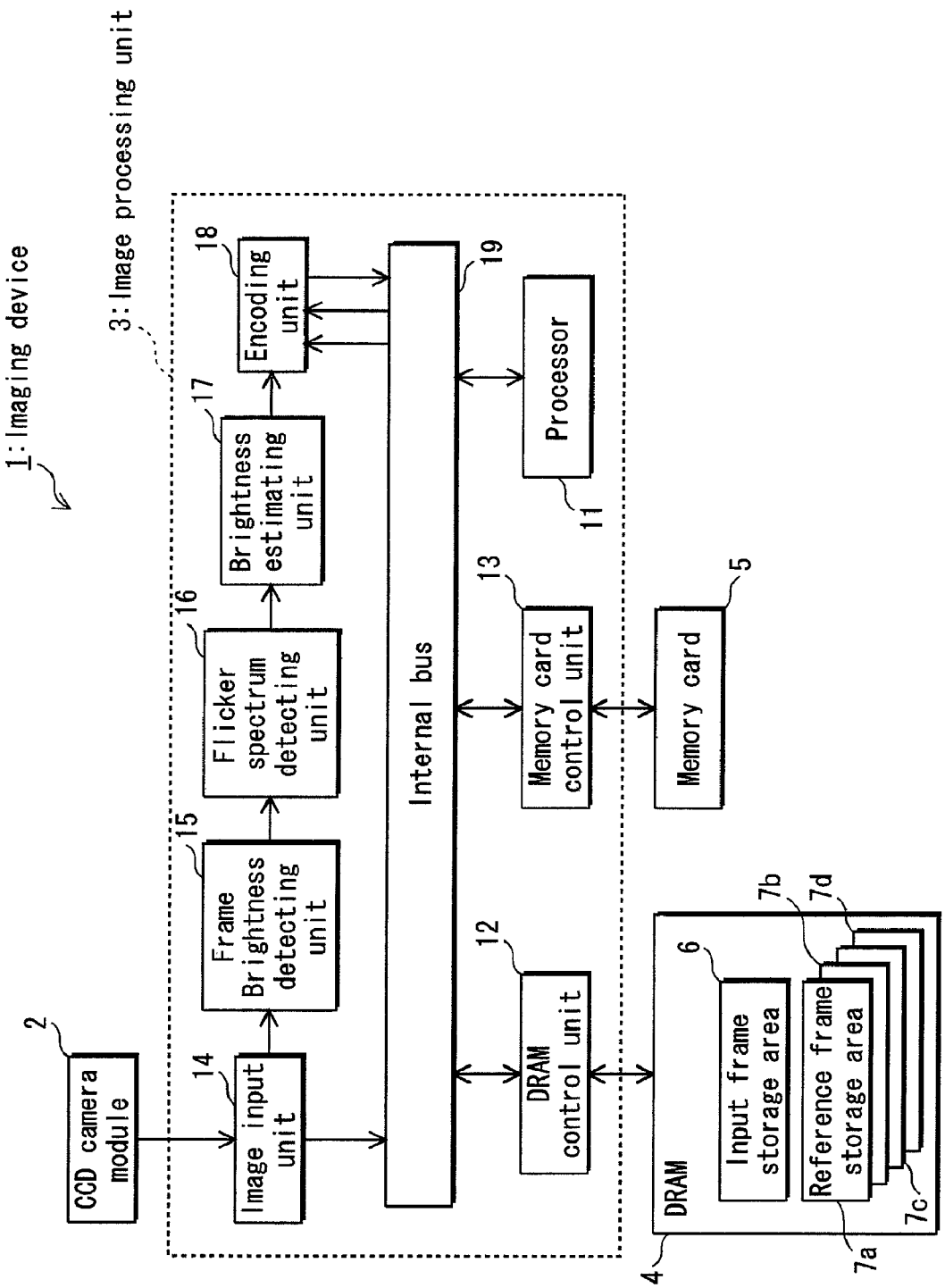
FIG. 1 is a block diagram of an imaging device consistent with a first embodiment.

The structure of an imaging device consistent with the present embodiment is described with reference to FIG. 1. FIG. 1 is a block diagram of an imaging device consistent with the present embodiment.

An imaging device 1 includes a CCD (Charge Coupled Device) camera module 2, an image processing unit 3, a DRAM (Dynamic Random Access Memory) 4, and a memory card 5. The imaging device has various functions including the high-speed video capturing function and capture a video at a set frame rate. Note that the imaging device 1 may be set to a frame rate higher than the frequency of fluorescent flicker.

The CCD camera module 2 alternately outputs 8-bit data pieces representing the brightness value (Y) and hue values (Cb and Cr) of captured video images to a later-described image input unit 14 included in the image processing unit 3.

The image processing unit 3 encodes a video that is input from the CCD camera module 2. Details of the image processing unit 3 will be described later.

The DRAM 4 has an input frame storage area 6 into which data representing the brightness value (Y) and hue values (Cb and Cr) of each of a plurality of image frames constricting the video captured by the CCD camera module 2 is stored by the image input unit 14 included in the image processing unit 3. The DRAM 4 also has reference frame storage areas 7a-7d into which image frames obtained as a result of the image frame encoding by the image processing unit 3 are stored as candidates for a next reference frame. Note that each image frame stored in the reference frame storage areas 7a-7d is referred to as a "candidate reference frame". According to the present embodiment, four candidate reference frames are stored one each in the reference frame storage areas 7a-7d, as will be described later in detail.

The memory card 5 is used to store encoded data obtained as a result of the image encoding by the image processing unit 3.

[Structure of Image Processing Unit 3]

As shown in FIG. 1, the image processing unit 3 includes a processor 11, a DRAM control unit 12, a memory card control unit 13, the image input unit 14, a frame brightness detecting unit 15, a flicker spectrum detecting unit 16, a brightness estimating unit 17, an encoding unit 18, and an internal bus 19. The processor 11, the DRAM control unit 12, the memory card control unit 13, the image input unit 14, and the encoding unit 18 are all separately connected to the internal bus 19.

The processor 11 controls, for example, the activation of the individual units within the image processing unit 3 via the internal bus 19. The DRAM control unit 12 reads and writes data to and from the DRAM 4. The memory card control unit 13 reads and writes data to and from the memory card 5.

The image input unit 14 outputs data representing the brightness value (Y) received from the CCD camera module 2 to the frame brightness detecting unit 15. In addition, the image input unit 14 also outputs data representing the brightness value (Y) as well as data representing the hue values (Cb and Cr) both received from the CCD camera module 2 to the DRAM control unit 12 via the internal bus 19. An image frame composed of the data pieces representing brightness value (Y) and hue values (Cb and Cr) is stored by the DRAM control unit 12 into the input frame storage area 6.

The frame brightness detecting unit 15 has a 32-bit counter. On a frame-by-frame basis, the frame brightness detecting unit 15 adds up the brightness values of pixels within one image frame and outputs the value obtained by the addition (hereinafter referred to as a "frame brightness value") to the flicker spectrum detecting unit 16.

The flicker spectrum detecting unit 16 has 512 32-bit buffers each for storing a frame brightness value input from the frame brightness detecting unit 15. That is, the flicker spectrum detecting unit 16 is capable of storing the frame brightness values of 512 frames.

Each time a new frame brightness value is received from the frame brightness detecting unit 15, the flicker spectrum detecting unit 16 replaces the oldest one of the frame brightness values stored in the buffers, with the new frame brightness value. The flicker spectrum detecting unit 16 samples 512 frame brightness values held in the 512 buffers in time series and applies the Fast Fourier transform (hereinafter, referred to as "FFT"), so that 512 32-bit spectrum values are obtained.

Next, the flicker spectrum detecting unit 16 conducts the following processes in order to determine whether or not fluorescent flicker components derived from the power frequency of 50 Hz or of 60 Hz are present.

The flicker spectrum detecting unit 16 compares the spectrum value obtained at 100 Hz with the spectrum value obtained at 120 Hz.

If the spectrum value at 100 Hz is larger than the spectrum value at 120 Hz, the flicker spectrum detecting unit 16 then compares the spectrum value at 100 Hz with a threshold value. If the spectrum value at 100 Hz exceeds the threshold value, it is judged that fluorescent flicker components derived from the power frequency of 50 Hz are present. If the threshold value is not exceeded, it is then judged that fluorescent flicker components are not present.

On the other hand, in the case where the spectrum value at 100 Hz is not larger than the spectrum value at 120 Hz, the flicker spectrum detecting unit 16 then compares the spectrum value at 120 Hz with the threshold value. If the spectrum value at 120 Hz exceeds a threshold value, it is judged that the fluorescent flicker components derived from the power frequency of 60 Hz are present. If the threshold value is not exceeded, it is then judged that fluorescent flicker components are not present.

The flicker spectrum detecting unit 16 outputs the obtained spectrum values to the brightness estimating unit 17, along with flicker information indicating the judgment result.

In view of various factors, including that the sensor characteristics differ one from another, it is preferable to determine the threshold value(s) using data that is obtained from images actually captured in advance in a fluorescent flickering environment and in a flicker-free environment.

The brightness estimating unit 17 conducts the following processing according to the flicker information received from the flicker spectrum detecting unit 16. By conducting the process, the brightness estimating unit 17 estimates the brightness produced by the light source at the time at which each image frame is captured.

In the case where the flicker information indicates the presence of fluorescent flicker components derived from the 50 Hz power frequency, the brightness estimating unit 17 extracts spectrum values at multiples of 100 Hz, namely at 100 Hz, 200 Hz, 300 Hz . . . , from among the spectrum values received from the flicker spectrum detecting unit 16. The brightness estimating unit 17 then applies the Inverse Fast Fourier transform (hereinafter referred to as "IFFT") to the extracted spectrum values at the respective frequencies to obtain the brightness values of the 512 frames. Each of the thus obtained brightness value is then output to a later-described motion estimation unit 31 included in the encoding unit 18, as the estimated brightness value of the light source as of the time at which a corresponding image frame is captured.

On the other hand, in the case where the flicker information indicates the presence of the fluorescent flicker components derived from the 60 Hz power frequency, the brightness estimating unit 17 extracts spectrum values at multiples of 120 Hz, namely at 120 Hz, 240 Hz, 360 Hz . . . , from among the spectrum values received from the flicker spectrum detecting unit 16. The brightness estimating unit 17 then applies the IFFT to the extracted spectrum values at the respective frequencies to obtain the brightness values of the 512 frames. Each of the thus obtained brightness value is then output to the motion estimation unit 31 included in the encoding unit 18, as the estimated brightness value of the light source as of the time at which a corresponding image frame is captured.

Through the above processes, the frequency components not induced by fluorescent flicker are excluded, so that the brightness change induced by fluorescent flicker is estimated for each of the 512 image frames.

If the flicker information indicates that fluorescent flicker components are not present, the brightness estimating unit 17 outputs a predetermined fixed value, as the estimated brightness value of the light source, to the motion estimation unit 31 included in the encoding unit 18.

Since fluorescent flicker occurs periodically, it is expected that the subsequent image frames exhibit a similar pattern. In view of this, the FFT and IFFT operations may be performed for every image frame or image frames at a predetermined interval.

The encoding unit 18 encodes each image frame captured by the CCD camera module 2 and stored in the input frame storage area 6, based on a corresponding estimated brightness value of the light source that is input from the brightness estimating unit 17. In the present embodiment, the encoding unit 18 performs video encoding according to the MPEG-4 AVC standard.

(Structure of Encoding Unit 18)

Figure 2:
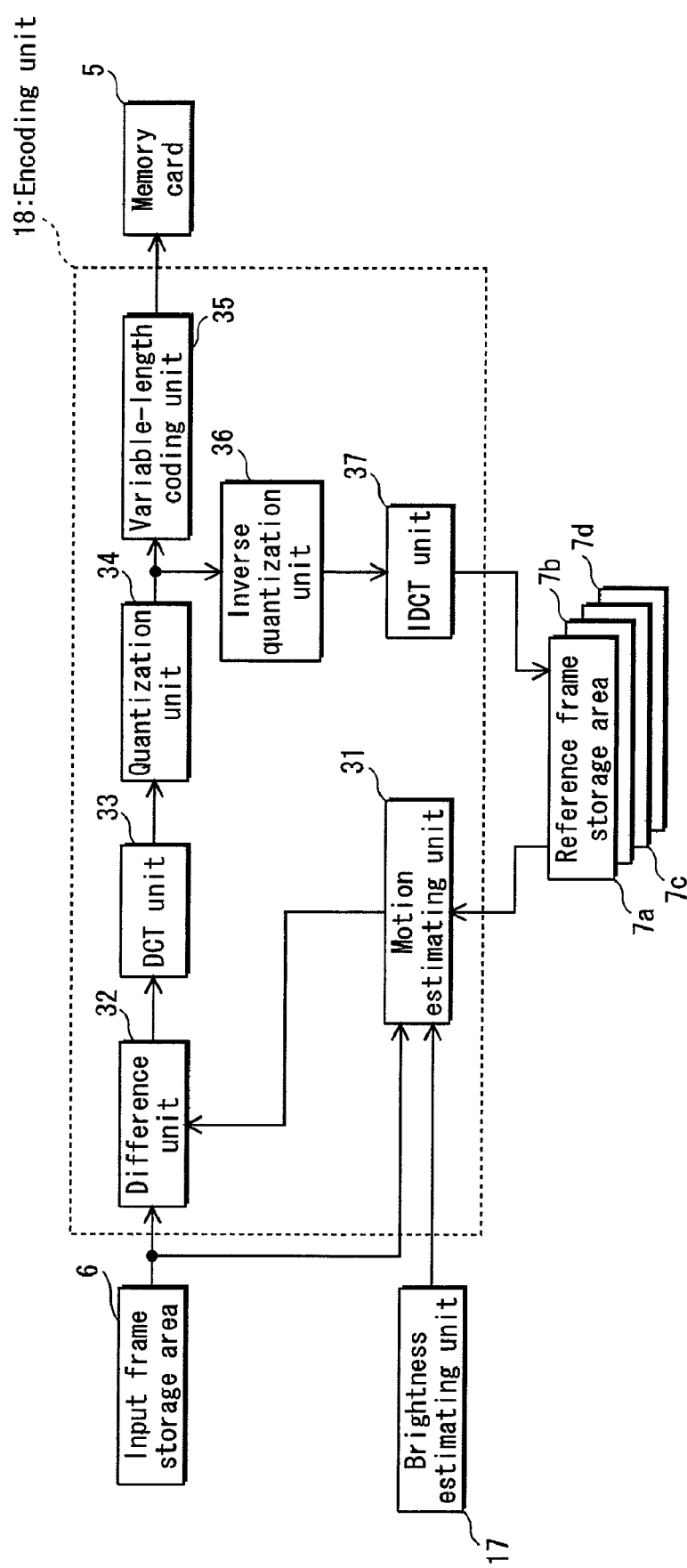
FIG. 2 is a block diagram of an encoding unit shown in FIG. 1.

The following describes the encoding unit 18 shown in FIG. 1, with reference to FIG. 2. FIG. 2 is a block diagram of the encoding unit 18 shown in FIG. 1. For the sake of simplicity, FIG. 2 does now show the internal bus 19 and the DRAM control unit 12 present between the encoding unit 18 and the DRAM 4. In addition, the internal bus 19 and the memory card control unit 13 present between the encoding unit 18 and the memory card 5 are not shown either.

The encoding unit 18 includes the motion estimation unit 31, a difference unit 32, a DCT unit 33, a quantization unit 34, a variable-length coding unit 35, an inverse quantization unit 36, and an IDCT unit 37.

Note, however, that video encoding according to MPEG-4 AVC may employ a different image frame as the reference frame. For this reason, the imaging device according to the present embodiment is configured to hold past four frames as candidate reference frames at all times in the reference frame storage areas 7a-7d in a manner to constitute a ring buffer. As a consequence, any of the stored candidate reference frames can be used as the reference frame. In the ring buffer structure, the memory location of a stored frame is uniquely identified by the frame number, by keeping a count of the frame numbers from the decoding start.

For the sake of convenience, the following description is given by way of an example in which the encoding unit 18 has completed the encoding of the image frames up to the one having the frame number "n−1", and the image frame having the frame number n is a current image frame to be encoded.

The DRAM control unit 12 reads the current image frame having the frame number n from the input frame storage area 6. The read image frame is input to the motion estimation unit 31 and also to the difference unit 32 via the internal bus 19.

In response to the input of the image frame having the frame number n from the brightness estimating unit 17, the motion estimation unit 31 calculates the reciprocal of the estimated brightness value $Y_n$, which is an estimate of the light source brightness as of the time at which the current image frame is captured. Then, the motion estimation unit 31 stores the reciprocal $1/Y_n$ of the estimated brightness value $Y_n$ as a brightness correction coefficient $G_n$ for the current image frame having the frame number n. Note that at the time of encoding the image frame having the frame number "n−i" (where i=1, 2, 3, and 4), the motion estimation unit 31 calculates the reciprocal of the estimated brightness value $Y_{n-i}$, which is an estimate of the light source brightness as of the time at which the image frame having the frame number "n−i" is captured. The motion estimation unit 31 stores the thus calculated reciprocal as the brightness correction coefficient $G_{n-i}$ (=$1/Y_{n-i}$) of the image frame having the frame number "n−i". Note that each brightness correction coefficient $G_{n-1}$ is used as the brightness correction coefficient of a corresponding candidate reference frame having the frame number "n−i" (where i=1, 2, 3, and 4).

Next, the motion estimation unit 31 determines, as the reference frame, the candidate reference frame having the brightness correction coefficient closest to the brightness correction coefficient $G_n$, from among the candidate reference frames, which are the past four image frames and held in the reference frame storage areas 7a-7d. The motion estimation unit 31 then acquires the candidate reference frame determined as the reference frame from an appropriate one of the reference frame storage areas 7a-7d via the internal bus 19 and the DRAM control unit 12. For the sake of convenience, the following description is given on the premise that the candidate reference frame having the frame number "n−n'" is determined as the reference frame. Accordingly, the brightness correction coefficient of the candidate reference frame having the frame number "n−n'" is denoted as $G_{n-n'}$.

Next, the motion estimation unit 31 estimates a motion vector for each macroblock, which is an l×m rectangular area, using the candidate reference frame having the frame number "n−n'" determined as the reference frame. Note that the motion vector is estimated by searching for a combination of x' and y' with which Equation 2 shown below results in the smallest sum of absolute difference SAD. The motion estimation unit 31 then performs the motion compensation using the estimated motion vector and outputs a prediction signal obtained by performing the motion compensation to the difference unit 32.

$$SAD(n', x', y') = \sum_{i=0}^{l} \sum_{j=0}^{m} |f_n(x+i, y+j) \times G_n - f_{n-n'}(x+x'+i, y+y'+j) \times G_{n-n'}|$$ [Equation 2]

Note that the notation | | represents an absolute value. Further, $f_n(x, y)$ represents the brightness value at the coordinates (x, y) on the current image frame to be encoded and having the frame number n, whereas $f_{n-n'}(x, y)$ represents the brightness value at the coordinates (x, y) on the reference frame, which is the selected candidate reference frame having the frame number "n−n'".

The difference unit 32 subtracts the prediction signal received from the motion estimation unit 31 from the image frame having the frame number n to generate a residual signal. The DCT unit 33 applies the discrete cosine transform (hereinafter referred to as "DCT") to the residual signal received from the difference unit 32 to generate a DCT coefficient. The quantization unit 34 performs quantization on the DCT coefficient received from the DCT unit 33 to calculate a quantization value. The variable-length coding unit 35 performs variable-length coding of the quantization value received from the quantization unit 34 to generate coded data of the image frame having the frame number n. The thus generated coded data is stored on the memory card 5 via the internal bus 19 and the memory card control unit 13.

The inverse quantization unit 36 performs inverse quantization on the quantization value received from the quantization unit 34 to calculate an inverse quantization value. The IDCT unit 37 applies the inverse discrete cosine transform (hereinafter referred to as "IDCT") to the inverse quantization value received from the inverse quantization unit 36. Through the processes described above, the image frame having the frame number n is decoded. The IDCT unit 37 then stores the thus decoded image frame having the frame number n to one of the reference frame storage areas 7a-7d storing the oldest one of the candidate reference frames (in this example, the candidate reference frame having the frame number "n−4"), via the internal bus 19 and the DRAM control unit 12. When the subsequent image frame having the frame number "n+1" is to be encoded, the reference frame storage areas 7a-7d hold four candidate reference frames, which are the four image frames having the frame numbers ranging from "n−3" to "n".

<Operation of Imaging Device 1>

Figure 3:
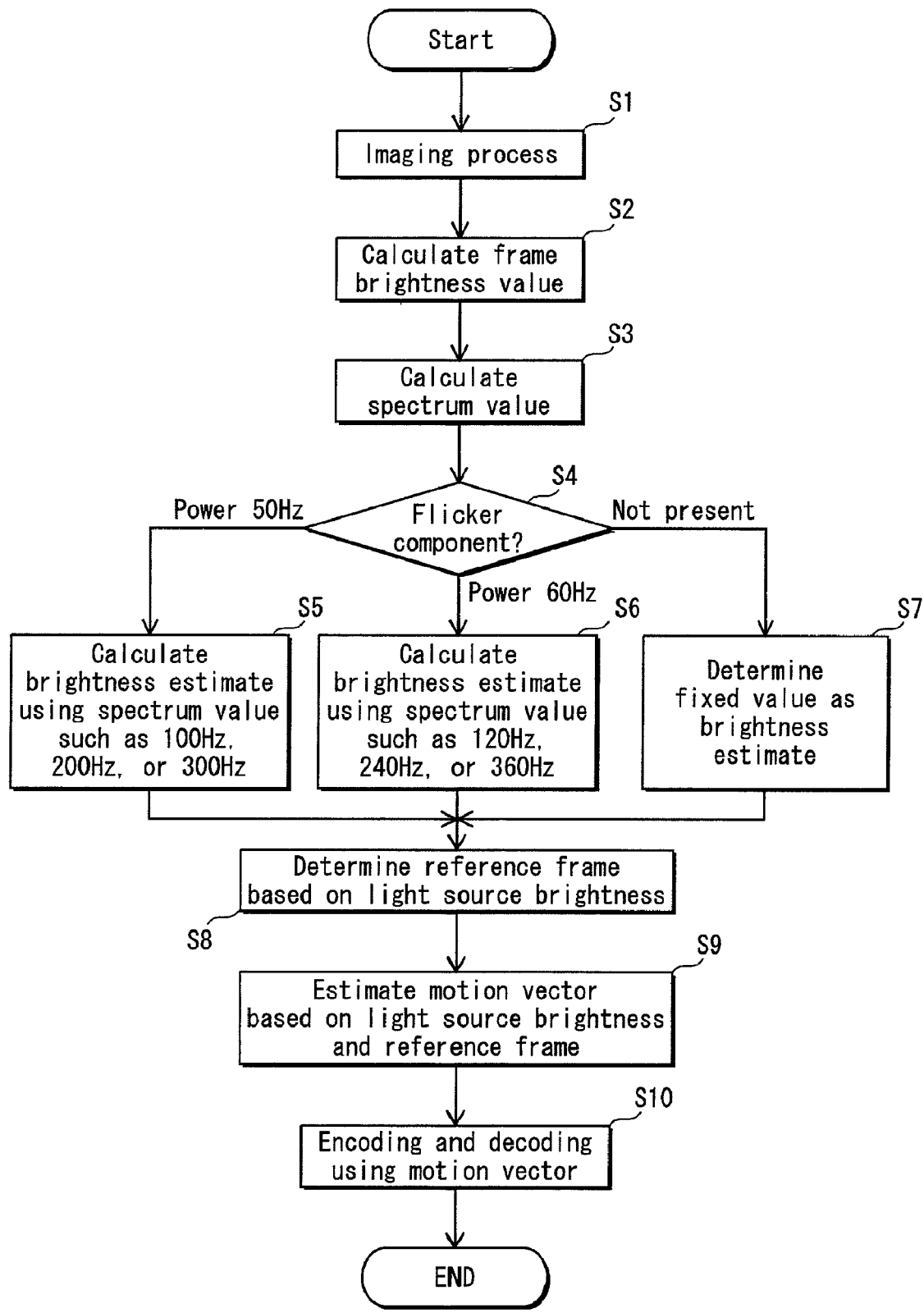
FIG. 3 is a flowchart showing the steps of image processing performed by the imaging device shown in FIG. 1.

The following describes the operation of the imaging device 1 shown in FIG. 1, with reference to FIG. 3. FIG. 3 is a flowchart showing the steps of image processing performed by the imaging device 1 shown in FIG. 1. Note that the processing flow covers a series of steps conducted on one image frame.

The CCD camera module 2 captures image frames constituting a video. Each time one image frame is captured, the image input unit 14 inputs data representing the brightness value (Y) of the captured image frame to the frame brightness detecting unit 15. In addition, the image input unit 14 inputs the data representing the brightness value (Y) and the hue values (Cb and Cr) of the image frame to the input frame storage area 6 via the internal bus 19 and the DRAM control unit 12. (Step S1)

On a frame-by-frame basis, the frame brightness detecting unit 15 adds up the brightness values of pixels within one image frame to calculate a frame brightness value (Step S2). The flicker spectrum detecting unit 16 calculates 512 spectrum values using the 512 frame brightness values of the 512 image frames having been calculated by the frame brightness detecting unit 15 (Step S3). The flicker spectrum detecting unit 16 judges, based on the calculated spectrum values, whether the fluorescent flicker components derived from the 50 Hz or 60 Hz power frequency are present or fluorescent flicker components are not present (Step S4).

If it is judged that fluorescent flicker components derived from the 50 Hz power frequency are present (S4: Power 50 Hz), the brightness estimating unit 17 estimates the values of the light source brightness as of the time at which each of the 512 image frames is captured, based on the spectrum values at 100 Hz, 200 Hz, 300 Hz . . . calculated by the flicker spectrum detecting unit 16 (Step S5). If it is judged that fluorescent flicker components derived from the 60 Hz power frequency are present (S4: Power 60 Hz), the brightness estimating unit 17 estimates the values of the light source brightness as of the time at which each of each of the 512 image frames is captured, based on the spectrum values at 120 Hz, 240 Hz, 360 Hz . . . calculated by the flicker spectrum detecting unit 16 (Step S6). If it is judged that fluorescent flicker components are not present (S4: not present), the brightness estimating unit 17 determines a fixed value uniformly as the estimated values of the light source brightness as of the time at which each of the 512 image frames is captured (Step S7).

The current image frame to be encoded is input from the input frame storage area 6 to the motion estimation unit 31 and also to the difference unit 32 via the DRAM control unit 12 and the internal bus 19. The motion estimation unit 31 calculates and stores a brightness correction coefficient for the current image frame from the estimated brightness value of the current image frame calculated or determined by the brightness estimating unit 17. Then, the motion estimation unit 31 selects, as the reference frame, a candidate reference frame having the brightness correction coefficient closest to the brightness correction coefficient of the current image frame, from among four candidate reference frames, which are the past four image frames stored in the reference frame storage areas 7a-7d (Step S8). Note that the brightness correction coefficients of the past four image frames are calculated and stored at the time of encoding the respective image frames. The thus stored brightness correction coefficients of the respective candidate reference frames are used as the brightness correction coefficients of corresponding candidate reference frames.

Next, the motion estimation unit 31 acquires the candidate reference frame determined as the reference frame, from an appropriate one of the reference frame storage areas 7a-7d via the internal bus 19 and the DRAM control unit 12. The motion estimation unit 31 then searches for a combination of x' and y' with which the sum of absolute difference SAD given by Equation 2 above becomes the minimum, so that a motion vector is estimated (Step S9).

The motion estimation unit 31 performs the motion compensation based on the estimated motion vector to generate a prediction signal. The difference unit 32 subtracts the prediction signal from the current image frame to generate a residual signal. The DCT unit 33, the quantization unit 34, and the variable-length coding unit 35 generate encoded data from the residual signal. The variable-length coding unit 35 stores the generated encoded data on the memory card 5 via the internal bus 19 and the memory card control unit 13. Further, the inverse quantization unit 36 and the IDCT unit 37 decode the current image frame to be encoded, from the quantization value output from the quantization unit 34. The IDCT unit 37 stores, via the internal bus 19 and the DRAM control unit 12, the decoded image frame as a new candidate reference frame into one of the reference frame storage areas in which the oldest candidate reference frame is stored (Step S10).

According to the embodiment described above, the analysis of fluorescent flicker components is carried out using the frame brightness values of the 512 image frames to estimate the light source brightness. Accordingly, the light source brightness is estimated with high accuracy.

For the motion estimation, the present embodiment determines, as the reference frame, one of the candidate reference frames that is closest to the image frame to be encoded in the estimated brightness value of the light source as of the time at which the image frame is captured. In addition, the motion vector estimation is performed, while the brightness difference between the current image frame to be encoded and the candidate reference frame determined as the reference frame is corrected using a coefficient. Consequently, errors in the motion vector estimation resulting from the changes in the light source brightness produced at the time of image capturing are reduced, while maintaining the efficiency of encoding.

As above, each image frame is encoded without directly correcting the brightness of the image frame. Accordingly, in the case of video capturing at high speed, the resulting encoded data of an image frame contains information representing the fluorescent flicker phenomenon per se. That is, the present embodiment is usable for the purpose of capturing images of the fluorescent flicker per se.

Figure 11:
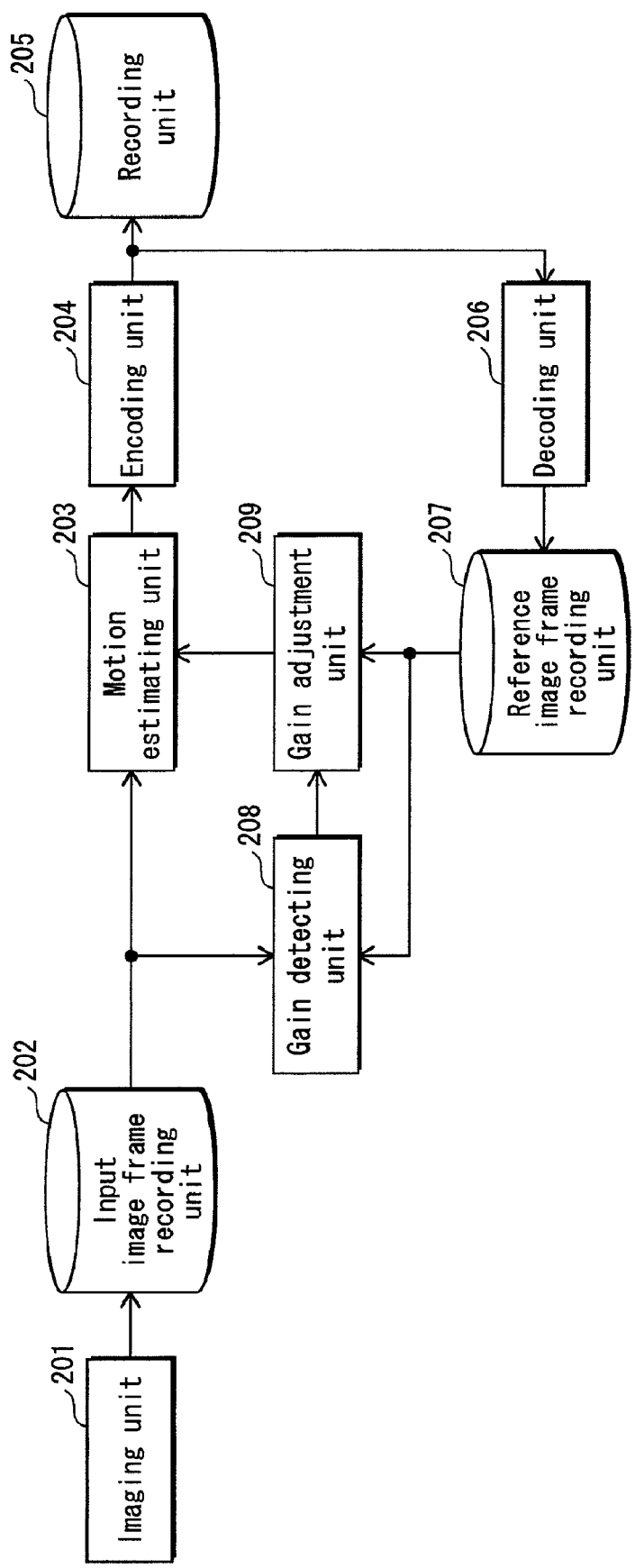
FIG. 11 is a block diagram of an imaging device having a conventional video encoding function provided in consideration of change of the light source brightness between image frames.
Figure 12:
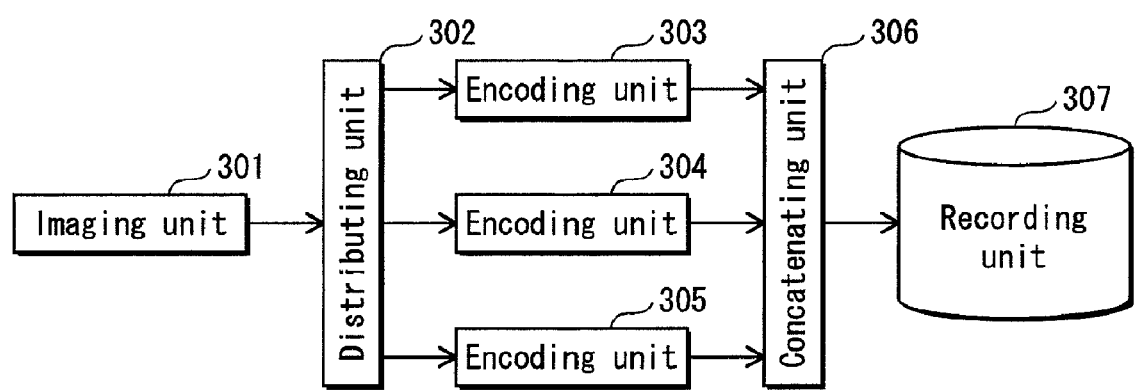
FIG. 12 is a block diagram of an imaging device for parallel execution of conventional video encoding.

Unlike the conventional technique described with reference to FIG. 11, the present embodiment does not require that encoded data contain a gain value, which provides compatibility with other encoders.

Second Embodiment

The following describes a second embodiment, with reference to the drawings. According to the present embodiment, the encoding parameter is a reference frame used for motion estimation.

According to the first embodiment, the encoding unit 18 determines, as a reference frame, a candidate reference frame having the brightness correction coefficient closest to the brightness correction coefficient of the current image frame to be encoded, from among past four image frames stored as the candidate reference frames. The encoding unit 18 then estimates a motion vector using non-corrected brightness values and non-corrected brightness correction coefficients. In contrast, according to the present embodiment, an encoding unit 18a determines, as a reference frame, a candidate reference frame having the smallest brightness correction coefficient from among the past four image frames acting as candidate reference frames and then estimates a motion vector using corrected brightness values and corrected brightness correction coefficients.

<Structure of Imaging Device>

Figure 4:
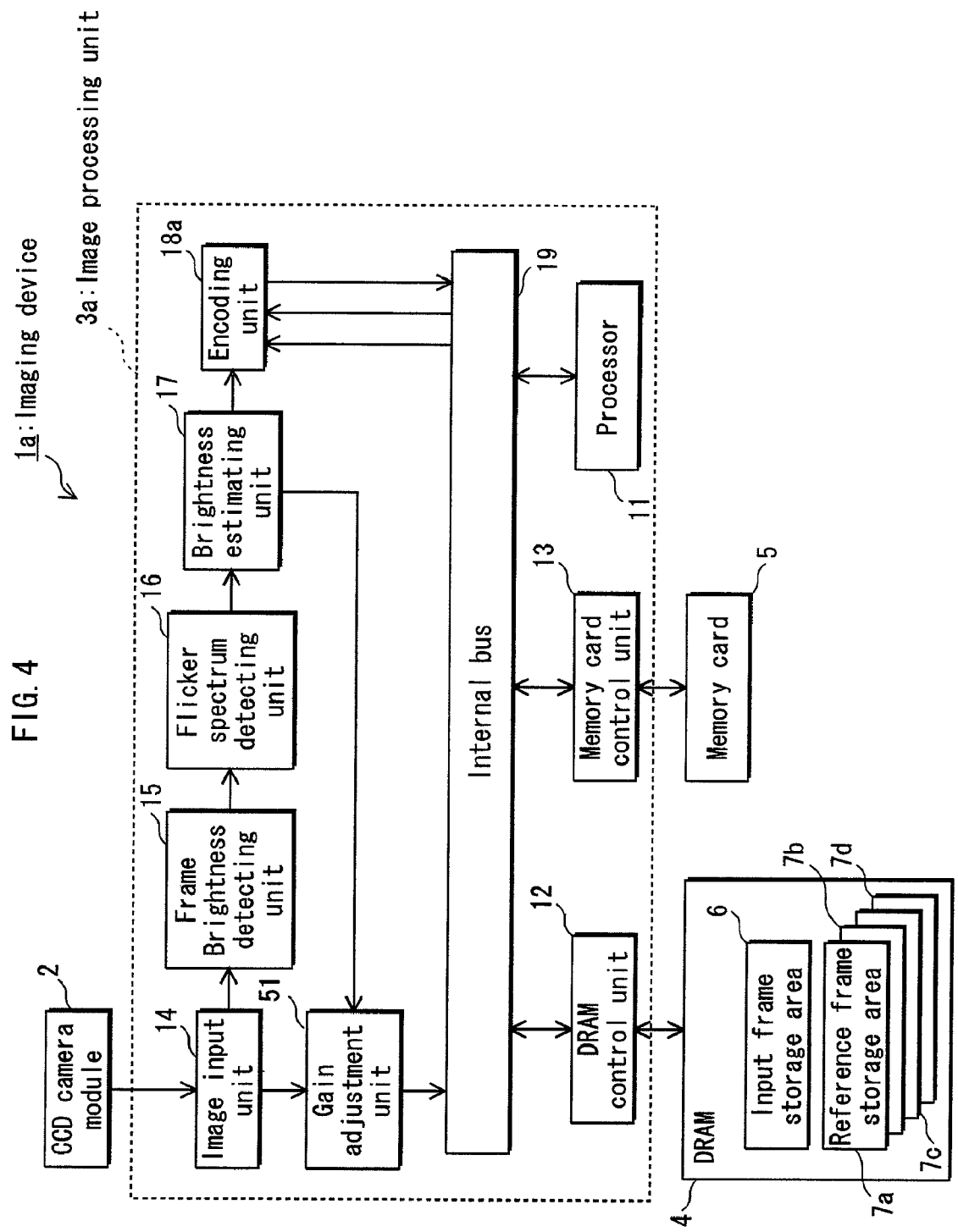
FIG. 4 is a block diagram of an imaging device consistent with a second embodiment.

The following describes the structure of the imaging device consistent with the present embodiment, with reference to FIG. 4. FIG. 4 is a block diagram of an imaging device consistent with the present embodiment. In the present embodiment, components that are substantially identical to the components of the first embodiment are denoted by the same reference numerals. Further, no description of such a component is given in the present embodiment since the same description is applicable.

An imaging device 1a includes the CCD camera module 2, an image processing unit 3a, the DRAM 4, and the memory card 5.

The image processing unit 3a encodes a video that is input from the CCD camera module 2. The following now describes the image processing unit 3a.

[Structure of Image Processing Unit 3a]

As shown in FIG. 4, the image processing unit 3a includes the processor 11, the DRAM control unit 12, the memory card control unit 13, the image input unit 14, the frame brightness detecting unit 15, the flicker spectrum detecting unit 16, the brightness estimating unit 17, a gain adjustment unit 51, the encoding unit 18a, and the internal bus 19. The processor 11, the DRAM control unit 12, the memory card control unit 13, the gain adjustment unit 51, and the encoding unit 18a are all separately connected to the internal bus 19. The image input unit 14 outputs data representing the brightness value (Y) of each image frame to the frame brightness detecting unit 15 and data representing the brightness value (Y) and the hue values (Cr and Cb) of each image frame to the gain adjustment unit 51. In addition, the brightness estimating unit 17 outputs an estimated brightness value produced by the light source at the time of image capturing to the gain adjustment unit 51 an also to a later-described motion estimation unit 31a included in the encoding unit 18a.

For the sake of convenience in description of the gain adjustment unit 51, the image frame having the frame number n is considered to be the current image frame to be encoded. Note, however, that the gain adjustment unit 51 performs a similar processing on each image frame having a frame number other than n. The gain adjustment unit 51 calculates the reciprocal of the estimated brightness value $Y_n$ of the current image frame having the frame number n received from the brightness estimating unit 17. The gain adjustment unit 51 then multiplies the brightness value (Y) of the image frame having the frame number n and received from the image input unit 14, by the reciprocal $1/Y_n$ to correct the brightness value (Y). The gain adjustment unit 51 then outputs the corrected brightness value (Y) and the hue values (Cb and Cr) of the current image frame having the frame number n to the DRAM control unit 12 via the internal bus 19. The DRAM control unit 12 then stores the corrected brightness value (Y) and the hue values (Cb and Cr) of the image frame having the frame number n into the input frame storage area 6. As described above, the present embodiment differs from the first embodiment in that the image frame is stored into the input frame storage area 6 after the brightness value (Y) is corrected.

The encoding unit 18a encodes an image frame captured by the CCD camera module 2 and stored in the input frame storage area 6, using the estimated brightness value of the light source received from the brightness estimating unit 17. In the present embodiment, the encoding unit 18a performs video encoding according to the MPEG-4 AVC standard.

(Structure of Encoding Unit 18a)

Figure 5:
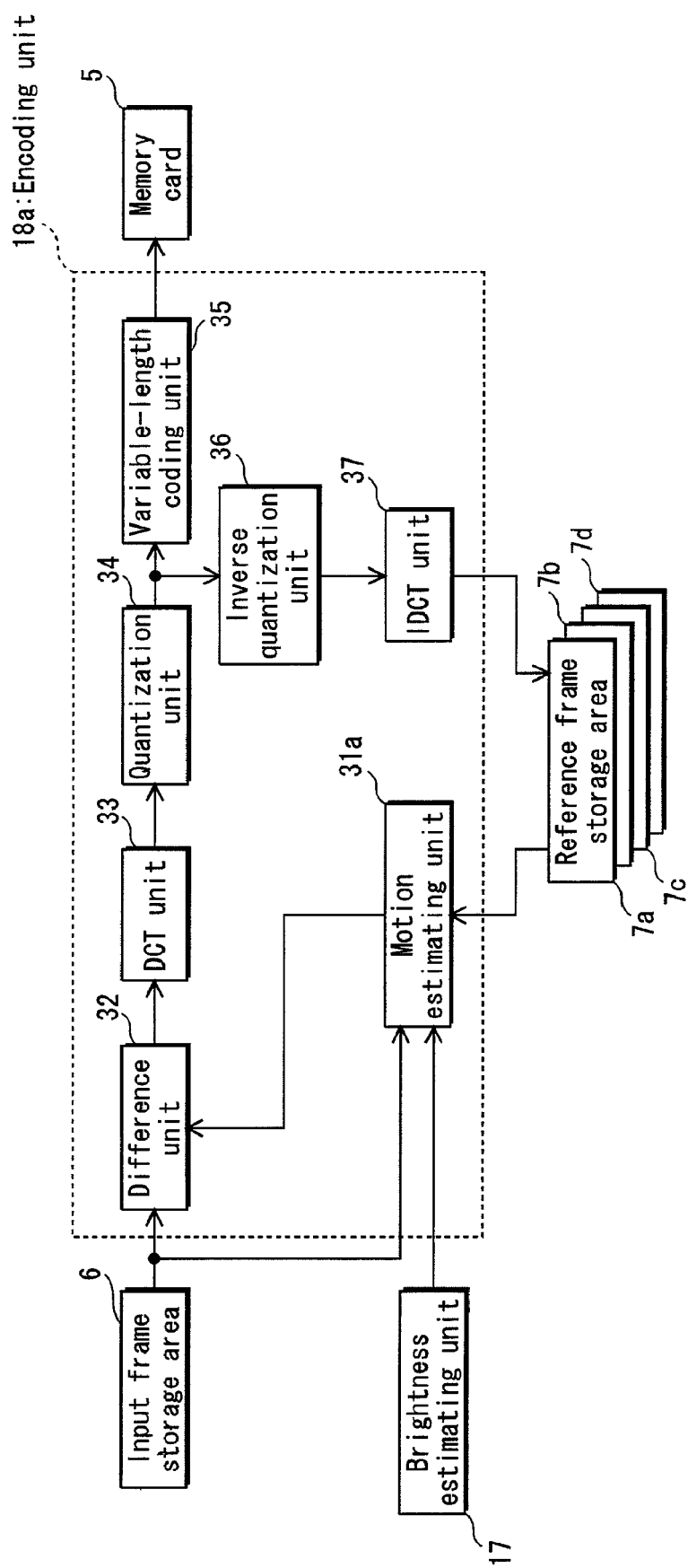
FIG. 5 is a block diagram of an encoding unit shown in FIG. 4.

The following describes the encoding unit 18a shown in FIG. 4, with reference to FIG. 5. FIG. 5 is a block diagram of the encoding unit 18a shown in FIG. 4. For the sake of simplicity, FIG. 5 does not show the internal bus 19 and the DRAM control unit 12 present between the encoding unit 18a and the DRAM 4. In addition, the internal bus 19 and the memory card control unit 13 present between the encoding unit 18a and the memory card 5 are not shown either.

The encoding unit 18a includes the motion estimation unit 31a, the difference unit 32, the DCT unit 33, the quantization unit 34, the variable-length coding unit 35, the inverse quantization unit 36, and the IDCT unit 37. Similarly to the first embodiment, the encoding unit 18a according to the present embodiment also stores past four image frames as candidate reference frames in the reference frame storage areas 7a-7d in a manner to constitute a ring buffer at all times. As a consequence, any of the stored candidate reference frames can be used as the reference frame.

For the sake of convenience, the following description is given by way of an example in which the encoding unit 18a has completed the encoding of the image frames up to the one having the frame number "n−1" and the image frame having the frame number n is a current image frame to be encoded.

In response to the input of the image frame having the frame number n from the brightness estimating unit 17, the motion estimation unit 31a calculates the reciprocal $1/Y_n$ of the estimated brightness value $Y_n$, which is an estimate of the light source brightness as of the time at which the current image frame is captured. Then, the motion estimation unit 31a stores the reciprocal $1/Y_n$ of the estimated brightness value $Y_n$ as a brightness correction coefficient $G_n$ for the current image frame having the frame number n. Note that at the time of encoding each image frame having the frame number "n−i" (i=1, 2, 3, and 4), the motion estimation unit 31a calculates the reciprocal of the estimated brightness value $Y_{n-i}$, which is an estimate of the light source brightness as of the time at which the image frame having the frame number "n−i" is captured. The motion estimation unit 31a stores the thus calculated reciprocal as a brightness correction coefficient $G_{n-i}$ ($=1/Y_{n-i}$). Note each brightness correction coefficient $G_{n-i}$ is used as the brightness correction coefficient of a corresponding candidate reference frame having the frame number "n−i" (i=1, 2, 3, and 4).

Next, the motion estimation unit 31a determines, as the reference frame, a candidate reference frame having the smallest brightness correction coefficient from among the past four image frames stored as the candidate reference frames in the reference frame storage areas 7a-7d. Then, the motion estimation unit 31a acquires the candidate reference frame determined as the reference frame from an appropriate one of the reference frame storage areas 7a-7d via the internal bus 19 and the DRAM control unit 12. For the sake of convenience in the description, it is assumed that the candidate reference frame having the frame number "n−n'" is determined as the reference frame.

Next, the motion estimation unit 31a estimates a motion vector for each macroblock, which is an l×m rectangular area, using the candidate reference frame having the frame number "n−n'". Note that the motion vector is estimated by searching for a combination of x' and y' with which the sum of absolute difference SAD given by Equation 3 below becomes smallest. The motion estimation unit 31a then performs motion compensation using the estimated motion vector to generate a prediction signal and outputs the prediction signal to the difference unit 32.

$$SAD(n', x', y') = \sum_{i=0}^{l} \sum_{j=0}^{m} |f_n(x+i, y+j) - f_{n-n'}(x+x'+i, y+y'+j)|$$ [Equation 3]

Note that the notation | | represents an absolute value. Further, $f_n(x, y)$ represents the brightness value at the coordinates (x, y) on the current image frame to be encoded and having the frame number n, whereas $f_{n-n'}(x, y)$ represents the brightness value at the coordinates (x, y) on the reference frame, which is the selected candidate reference frame having the frame number "n−n'".

Since the brightness has been corrected by the gain adjustment unit 51, the evaluation function employed in this embodiment is the same as a conventional evaluation function.

<Operation of Imaging Device 1a>

Figure 6:
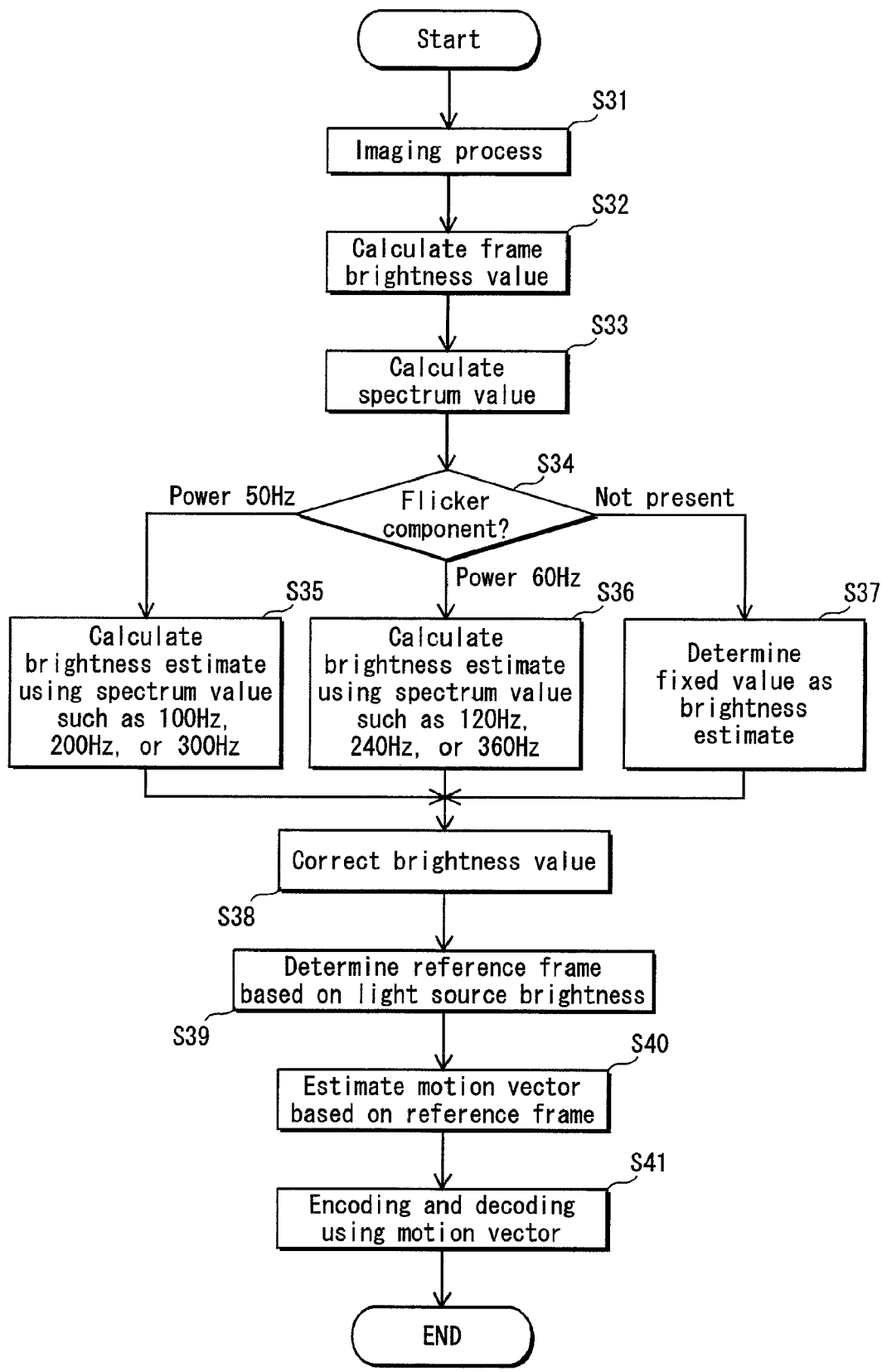
FIG. 6 is a flowchart showing the steps of image processing performed by the imaging device shown in FIG. 4.

The following now describes the operation of the imaging device 1a shown in FIG. 4, with reference to FIG. 6. FIG. 6 is a flowchart showing the steps of image processing performed by the imaging device 1a shown in FIG. 4. The processing flow covers a series of steps conducted on one image frame.

The CCD camera module 2 captures image frames of a video. Each time one image frame is captured, the image input unit 14 inputs data representing the brightness value (Y) of the captured image frame to the frame brightness detecting unit 15. In addition, the image input unit 14 inputs data representing the brightness value (Y) and the hue values (Cb and Cr) of the captured image frame to the gain adjustment unit 51. (Step S31)

The frame brightness detecting unit 15 performs substantially the same processing as in Step S2 (Step S32). Similarly, the flicker spectrum detecting unit 16 performs substantially the same processing as in Step S3 (Step S33). Next, the brightness estimating unit 17 performs substantially the same processing as in Steps S4-S7 (Steps S34-S37). The gain adjustment unit 51 calculates the reciprocal of the estimated brightness value that is calculated or determined by the brightness estimating unit 17. The gain adjustment unit 51 then corrects the brightness value (Y) of the image frame having the frame number and input from the image input unit 14, by multiplying the brightness value (Y) by the thus calculated reciprocal. The gain adjustment unit 51 then stores the corrected brightness value (Y) and the hue values (Cb and Cr) as data of the image frame, into the input frame storage area 6 via the internal bus 19 and the DRAM control unit 12 (Step S38).

The image frame stored in the input frame storage area 6 is input to the motion estimation unit 31a and also to the difference unit 32 via the DRAM control unit 12 and the internal bus 19. In the manner described above, the motion estimation unit 31a calculates and stores the brightness correction coefficient of the current image frame to be encoded, from the estimated brightness value that is calculated or determined by the brightness estimating unit 17. The motion estimation unit 31a then determines, as a reference frame, a candidate reference frame having the smallest brightness correction coefficient from among the past four image frames stored as candidate reference frames (Step S39). Note that the brightness correction coefficients of the past four image frames are calculated and stored at the time of encoding the respective image frames. The thus stored brightness correction coefficients of the respective candidate reference frames are used as the brightness correction coefficients of corresponding candidate reference frames.

Next, the motion estimation unit 31a acquires one of the candidate reference frames that is determined as the reference frame, from an appropriate one of the reference frame storage areas 7a-7d via the internal bus 19 and the DRAM control unit 12. By using the acquired candidate reference frame, the motion estimation unit 31a estimates a motion vector by searching for a combination of x' and y' with which the sum of absolute difference SAD given by Equation 3 becomes smallest (Step S40).

The motion estimation unit 31a performs motion compensation based on the estimated motion vector to generate a prediction signal. The difference unit 32, the DCT unit 33, the quantization unit 34, and the variable-length coding unit 35 perform the encoding of the current image frame, whereas the inverse quantization unit 36 and the IDCT unit 37 performs the decoding of the current image frame (Step S41).

According to the embodiment described above, it is ensured that the reference frame is one of the candidate reference frames that is captured under the highest brightness of the light source, i.e., with the highest S/N ratio. By selecting such a reference frame, the efficient image encoding is ensured.

Third Embodiment

The following describes a third embodiment, with reference to the drawings. According to the present embodiment, the encoding parameter is an encoding unit that performs encoding of an image frame.

According to the first and second embodiments, the imaging devices 1 and 1a each perform the encoding using one encoding unit. In contrast, an imaging device 1b according to the third embodiment performs encoding using three encoding units in parallel.

<Structure of Imaging Device>

Figure 7:
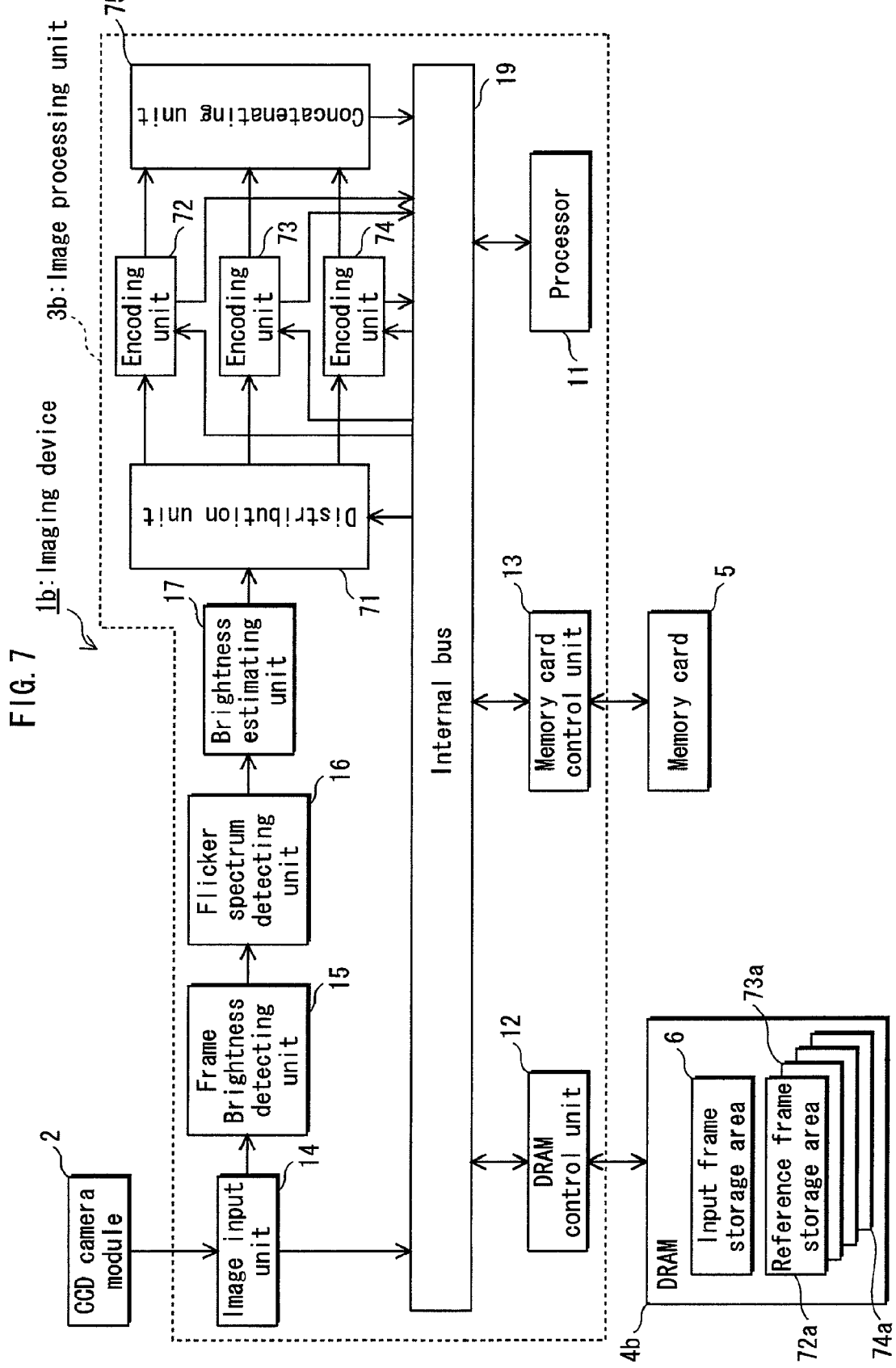
FIG. 7 is a block diagram of an imaging device consistent with a third embodiment.

The following describes the structure of the imaging device consistent with the present embodiment, with reference to FIG. 7. FIG. 7 is a block diagram of an imaging device consistent with the present embodiment. In the present embodiment, components that are substantially identical to the components of the first embodiment are denoted by the same reference numerals. Further, no description of such a component is given in the present embodiment since the same description is applicable.

The imaging device 1b includes the CCD camera module 2, an image processing unit 3b, a DRAM 4b, and the memory card 5.

The DRAM 4b has reference frame storage areas 72a, 73a, and 74a that are provided in one-to-one correspondence with encoding units 72, 73, and 74 included in the image processing unit 3b. Each of the reference frame storage areas 72a, 73a, and 74a is capable of storing one reference frame.

The image processing unit 3b encodes image frames input from the CCD camera module 2. The following now describes the image processing unit 3b.

[Structure of Image Processing Unit 3b]

As shown in FIG. 7, the image processing unit 3b includes the processor 11, the DRAM control unit 12, the memory card control unit 13, the image input unit 14, the frame brightness detecting unit 15, the flicker spectrum detecting unit 16, the brightness estimating unit 17, a distribution unit 71, the encoding units 72, 73, and 74, a concatenating unit 75, and the internal bus 19. The processor 11, the DRAM control unit 12, the memory card control unit 13, the image input unit 14, the distribution unit 71, the encoding units 72, 73, and 74, and the concatenating unit 75 are all separately connected to the internal bus 19. The brightness estimating unit 17 outputs an estimated brightness value of the light source to the distribution unit 71.

The distribution unit 71 stores, for each of the encoding units 72-74, an estimated value of the light source brightness as of the time of capturing of an image frame currently being encoded by a corresponding one of the encoding units 72-74. If no image frame is currently being encoded by a corresponding encoding unit, the stored estimated value is of the brightness as of the time of capturing the most recently encoded image frame.

The distribution unit 71 receives, from the brightness estimating unit 17, the estimated value of the light source brightness as of the time at which the current image frame to be encoded is captured. The distribution unit 71 selects one of the encoding units 72-74 not currently performing any encoding process and causes the selected encoding unit to encode the image frame to be encoded. Here, the encoding unit to be selected is the one storing the estimated brightness value closest to the estimated value of the light source brightness as of the time at which the current image frame to be encoded is captured. As mentioned above, the estimated brightness value stored in the encoding unit not currently encoding any image frame is of the light source brightness at the time of capturing the most recently encoded image frame. The distribution unit 71 then acquires the current image frame to be encoded, from the input frame storage area 6 via the internal bus 19 and the DRAM control unit 12 and outputs the acquired image frame to the thus selected encoding unit along with the estimated value of the light source brightness at the time of capturing the current image frame to be encoded. In addition, the distribution unit 71 updates the estimated value of the light source brightness stored for the selected encoding unit using the estimated value of the light source brightness as of the time at which the current image frame to be encoded is captured.

Each of the encoding units 72, 73, and 74 encode image frames captured by the CCD camera module 2 and then input from the distribution unit 71. The encoding units 72, 73, and 74 output encoded data obtained as a result of the encoding to the concatenating unit 75. Details of the encoding units 72, 73, and 74 will be given later. In the present embodiment, the encoding units 72, 73, and 74 each perform video encoding according to the MPEG-4 AVC standard.

The concatenating unit 75 concatenates pieces of encoded data input from the encoding units 72, 73, and 74 into one piece of encoded data in the order of frame numbers, and output the concatenated encoded data to the memory card control unit 13 via the internal bus 19. The memory card control unit 13 then stores the concatenated encoded data onto the memory card 5.

(Structures of Encoding Units 72, 73, and 74)

Figure 8:
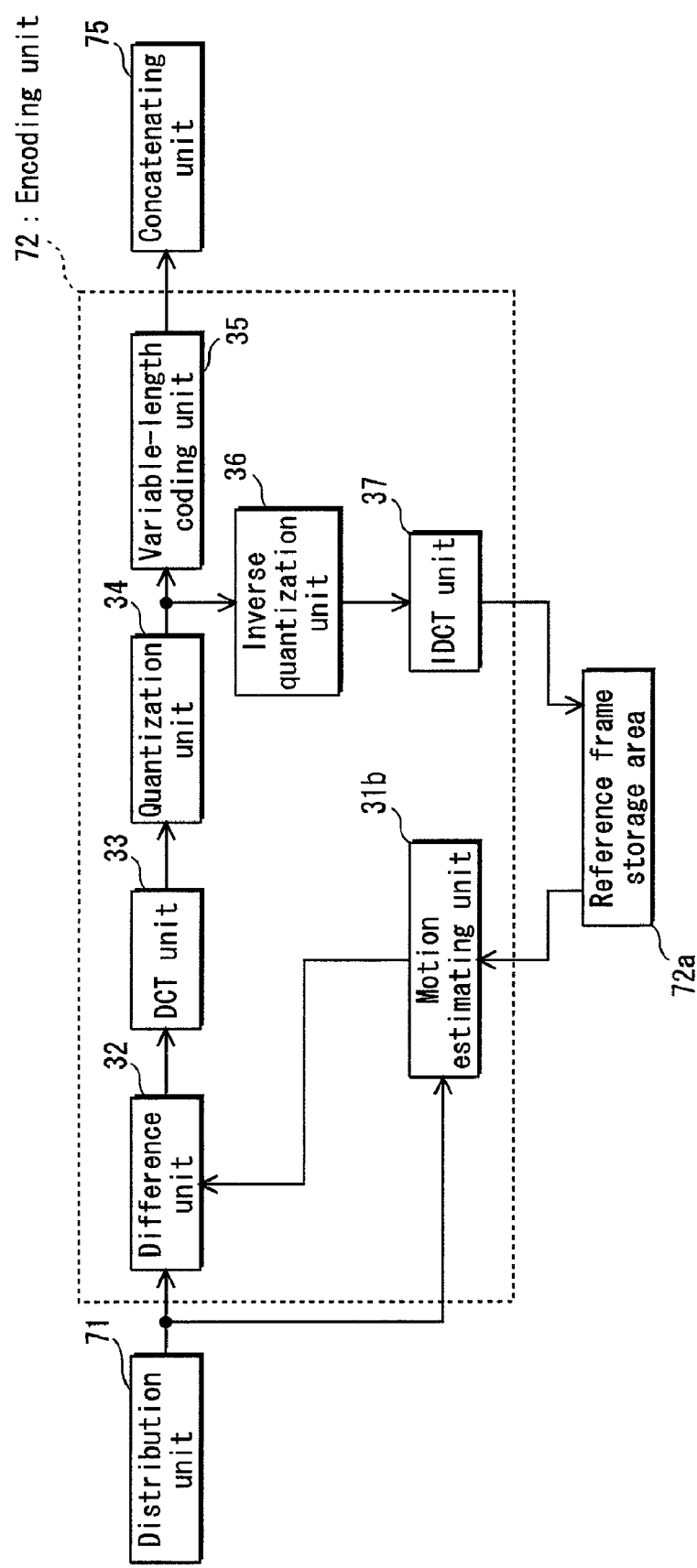
FIG. 8 is a block diagram of an encoding unit shown in FIG. 7.

The following describes the structure of the encoding unit 72 shown in FIG. 7, with reference to FIG. 8. FIG. 8 is a block diagram of the encoding unit 72 shown in FIG. 7. For the sake of simplicity, FIG. 8 does not show the internal bus 19 and the DRAM control unit 12 present between the encoding unit 72 and the DRAM 4. According to the present embodiment, the encoding units 73 and 74 are substantially the same as the encoding unit 72 in structure and operation. Since the description of the encoding unit 72 is directly applicable, no further description of the encoding units 73 and 74 are given in the present embodiment.

The encoding unit 72 includes a motion estimation unit 31b, the difference unit 32, the DCT unit 33, the quantization unit 34, the variable-length coding unit 35, the inverse quantization unit 36, and the IDCT unit 37.

In the following description, it is assumed that the image frame to be encoded next by the encoding unit 72 has the frame number n, and the image frame most recently encoded by the encoding unit 72 has the frame number "n–n'".

In response to the input of the image frame having the frame number n from the brightness estimating unit 17, the motion estimation unit 31b calculates the reciprocal of the estimated brightness value $Y_n$, which is an estimate of the light source brightness as of the time at which the current image frame is captured. Then the motion estimation unit 31b stores the calculated reciprocal $1/Y_n$ of the estimated brightness value $Y_n$ as a brightness correction coefficient $G_n$ for the image frame having the frame number n. Note that at the time when the encoding unit 72 encodes each image frame having the frame number "n–n'", the motion estimation unit 31b calculates the reciprocal of the estimated brightness value $Y_{n-n'}$, which is an estimate of the light source brightness as of the time at which the image frame having the frame number "n–n'" is captured. The motion estimation unit 31b stores the thus calculated reciprocal as the brightness correction coefficient $G_{n-i}$ ($=1/Y_{n-i}$) of the image frame having the frame number "n–n'". Note that each brightness correction coefficient $G_{n-i}$ is used as the brightness correction coefficient of a corresponding candidate reference frame having the frame number "n–n'".

The motion estimation unit 31b acquires the reference frame having the frame number "n–n'" from the reference frame storage area 72a via the DRAM control unit 12 and the internal bus 19. Next, the motion estimation unit 31b estimates a motion vector for each macroblock, which is an l×m rectangular area, using the reference frame having the frame number "n–n'". Note that the motion vector is estimated by searching for a combination of x' and y' with which the sum of absolute difference SAD given by Equation 2 above becomes smallest. The motion estimation unit 31b then performs motion compensation using the estimated motion vector to generate a prediction signal and outputs the thus generated predication signal to the difference unit 32.

According to the present embodiment, the variable-length coding unit 35 outputs coded data to the concatenating unit 75, and the IDCT unit 37 stores the decoded image frame having the frame number n into the reference frame storage area 72a as a new reference frame.

<Operation of Imaging Device 1b>

Figure 9:
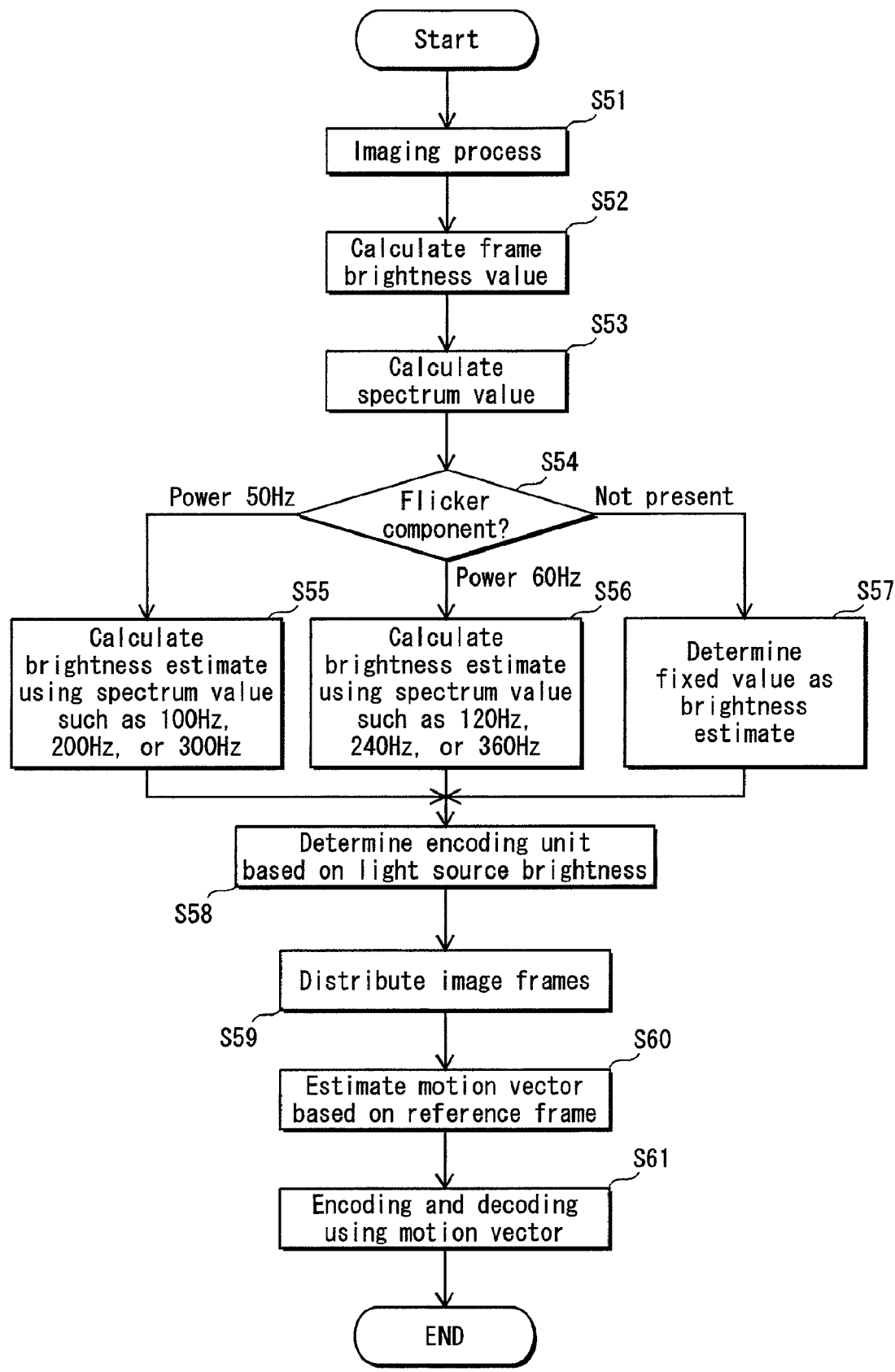
FIG. 9 is a flowchart showing the steps of image processing performed by the imaging device shown in FIG. 7.
Figure 10:
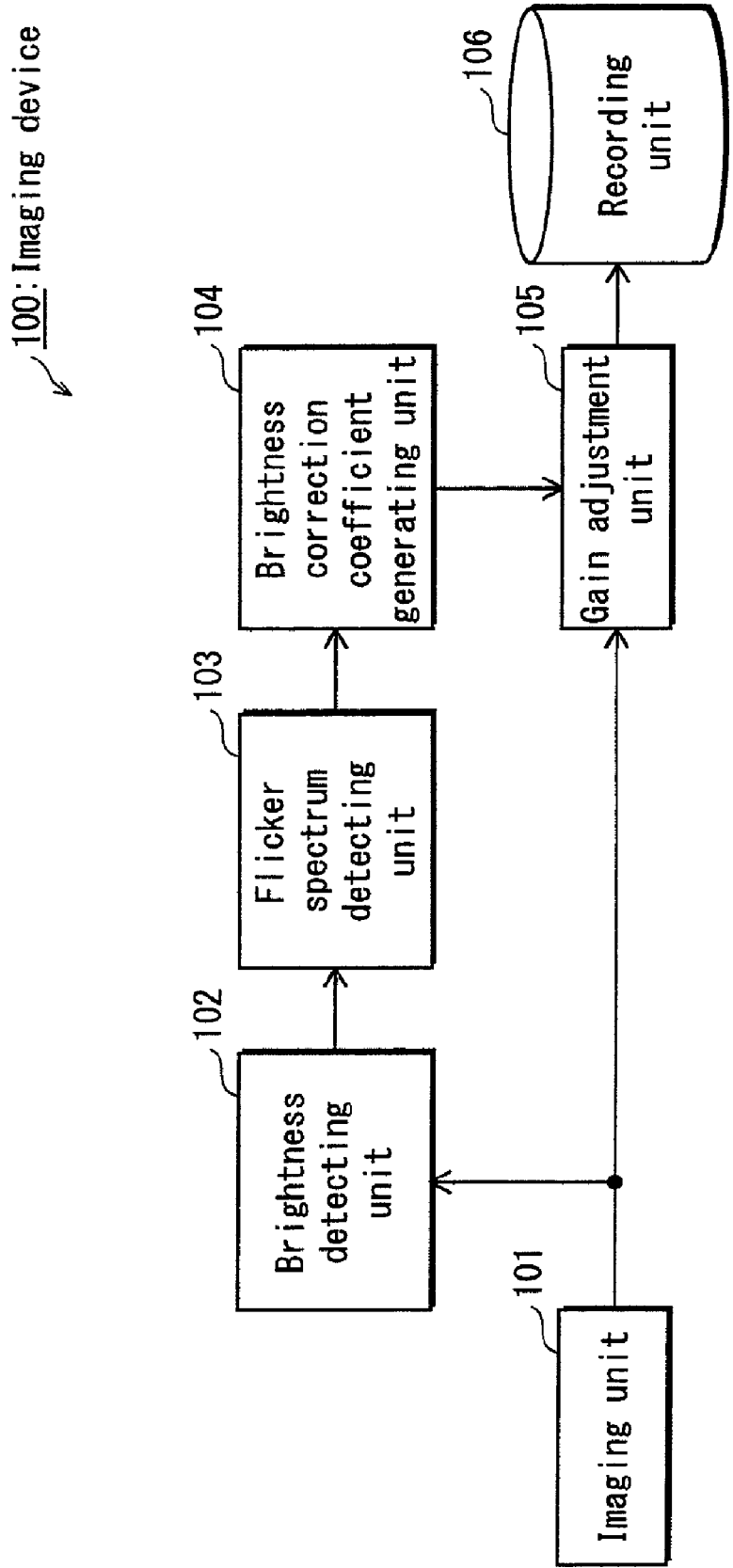
FIG. 10 is a block diagram of an imaging device having a covenantal flicker removing function.

The following describes the operation of the imaging device 1b shown in FIG. 7, with reference to FIG. 9. FIG. 9 is a flowchart showing the steps of image processing performed by the imaging device 1b shown in FIG. 7. The processing flow covers a series of steps conducted on one image frame.

The CCD camera module 2 and the image input unit 14 perform substantially the same processing as in Step S1 (Step S51).

The frame brightness detecting unit 15 performs substantially the same processing as in Step S2 (Step S52), and the flicker spectrum detecting unit 16 performs substantially the same processing as in Step S3 (Step S53). Next, the brightness estimating unit 17 performs substantially the same processing as in Steps S4-S7 (Steps S54-S57).

The distribution unit 71 selects one of the encoding units 72-74 in the above-described manner as an encoding unit for encoding the current image frame (Step S58). The distribution unit 71 then acquires the current image frame to be encoded, from the input frame storage area 6 via the internal bus 19 and the DRAM control unit 12 and outputs the acquired image frame to the thus selected encoding unit, along with the estimated value of the light source brightness produced as of the time at which the current image frame is captured (Step S59). In addition, the distribution unit 71 updates the estimated value of the light source brightness stored for the selected encoding unit, using the estimated value of the light source brightness corresponding to the current image frame to be encoded.

The motion estimation unit 31b included in the encoding unit selected in Step S58 calculates the brightness correction coefficient of the image frame using the estimated value of the light brightness corresponding to the image frame received from the distribution unit 71 and stores the calculated brightness correction coefficient. The motion estimation unit 31a then estimates a motion vector using the reference frame stored in the reference frame storage area. The motion vector is estimated by searching for a combination of x' and y' with which the sum of absolute difference SAD given by Equation 2 above becomes smallest (Step S60). Note that the brightness correction coefficient of the reference frame is calculated and stored at the time of encoding the image frame which is now used as the reference frame.

The motion estimation unit 31b performs motion compensation based on the estimated motion vector to generate a prediction signal. The difference unit 32, the DCT unit 33, the quantization unit 34, and the variable-length coding unit 35 perform the encoding of the current image frame, whereas the variable-length coding unit 35 outputs encoded data to the the concatenating unit 75. In response, the concatenating unit 75 concatenates pieces of encoded data and stores the concatenated data into the memory card 5 via the internal bus 19 and the memory card control unit 13. In addition, the inverse quantization unit 36 and the IDCT unit 37 perform decoding of the current image frame. The IDCT unit 37 then stores the decoded image frame as a reference frame into one of the reference frame storage areas corresponding to the encoding unit in which the IDCT unit 37 is included, via the internal bus 19 and the DRAM control unit 12 (Step S61).

According to the above-described embodiment, the encoding unit to be selected to encode the current image frame is the one having encoded an image frame which is closest to the current image frame in the estimated value of the light source brightness at the time of image capturing. In addition, the motion vector estimation is performed, while the brightness difference between the current image frame and the reference frame is corrected using a coefficient. With this configuration, the parallel processing by the encoding units serves to increase the speed of encoding processing. In addition, errors in the motion vector estimation resulting from the changes in the light source brightness at the time of image capturing is reduced, while maintaining the efficiency of encoding.

<<Supplemental Note>>

The present invention is not limited to the specific embodiments described above and various modifications including the following examples still fall within the scope of the present invention.

(1) According to each of the first and third embodiments described above, the motion vector estimating units 31 and 31b estimate a motion vector using Equation 2 shown above as the evaluation function. Yet, the estimation function usable for the motion vector estimation is not limited to Equation 2. For example, either of Equations 4 and 5 below may be used instead.

$$SAD(n', x', y') = \sum_{i=0}^{l} \sum_{j=0}^{m} \left| \begin{array}{c} f_n(x+i, y+j) \times G_n - \\ f_{n-n'}(x+x'+i, y+y'+j) \times G_{n-n'} \end{array} \right|^2 \quad \text{[Equation 4]}$$

$$SAD(n', x', y') = \sum_{i=0}^{l} \sum_{j=0}^{m} \left\{ \begin{array}{c} f_n(x+i, y+j) \times G_n - \\ f_{n-n'}(x+x'+i, y+y'+j) \times G_{n-n'} \end{array} \right\} \quad \text{[Equation 5]}$$

According to the second embodiment described above, the motion vector estimating unit 31a estimates a motion vector using Equation 3 shown above as the evaluation function. Yet, the estimation function usable for the motion vector estimation is not limited to Equation 6. For example, either of Equations 6 and 7 below may be used instead.

$$SAD(n', x', y') = \sum_{i=0}^{l} \sum_{j=0}^{m} |f_n(x+i, y+j) - f_{n-n'}(x+x'+i, y+y'+j)|^2 \quad \text{[Equation 6]}$$

$$SAD(n', x', y') = \sum_{i=0}^{l} \sum_{j=0}^{m} \{f_n(x+i, y+j) - f_{n-n'}(x+x'+i, y+y'+j)\} \quad \text{[Equation 7]}$$

(2) According to each of the first to third embodiments described above, the flicker spectrum detecting unit 16 detects the presence of fluorescent flicker components using the spectrum values at 100 Hz and 120 Hz. Yet, the flicker component detection is not limited to such. For example, the flicker spectrum detecting unit 16 may detect the presence of fluorescent flicker derived from the 50 Hz power frequency, using the spectrum values at frequencies (200 Hz, 300 Hz . . . ), which are multiples (excluding an multiple of 1) of double the power frequency (100 Hz). Alternatively, the flicker spectrum detecting unit 16 may detect the presence of fluorescent flicker derived from the 60 Hz power frequency, using the spectrum values at frequencies (240 Hz, 360 Hz . . . ), which are multiples (excluding an multiple of 1) of double the power frequency (120 Hz).

(3) According to each of the first and second embodiments, the past four image frames are used as candidate reference frames. Alternatively, the past N image frames (where N=2, 3, 5, 6 . . . ) may be used as candidate reference frames.

According to the third embodiment described above, the number of encoding units is three but the number of encoding units is not limited to such. For example, N encoding units may be employed (where N=2, 4, 5

(4) According to each of the first and second embodiments described above, the reference frame is selected based on the brightness correction coefficients but this is without limitation. For example, the reference frame may be selected based on the frame brightness values. In this case, the motion estimation unit 31 according to the first embodiment selects, from among four image frames, a candidate reference frame having the frame brightness value that is closest to the frame brightness value of the image frame to be encoded. In the case of the second embodiment, the motion estimation unit 31a selects, as the reference frame, a candidate reference frame having the largest frame brightness value from among the four past image frames acting as candidate reference frames.

In addition, according to the third embodiment, the distribution unit 71 selects one of the encoding units for distribution of an image frame to be encoded, based on an estimate of the light source brightness at the time of capturing the image to be encoded. Yet, the selection of the distribution unit is not limited to such. For example, the distribution unit 71 may make the selection of an encoding unit based on the reciprocal of an estimated value of the light source brightness at the time of capturing the image frame to be encoded.

(5) In the third embodiment, the encoding units 72, 73, and 74 may be replaced by the encoding units 18 and 18a consistent with the first and second embodiments or by any other encoding unit having a general structure. In addition, the encoding units 72, 73, and 74 may use the evaluation function that is irrelevant to the brightness correction coefficient (Equations 3, 6, and 7 are examples of such evaluation functions).

(6) According each of the first to third embodiments described above, the encoding units 18, 18a, 72, 73, and 74 video encoding according to the MPEG-4 AVC standard. Yet, the video encoding performed by the encoding units its not limited to such and video encoding according to any other standard may be acceptable as long as a past image frame is used as a reference frame.

(7) According to each of the first to third embodiments described above, the light source brightness at the time of image capturing is estimated by the frame brightness detecting unit 15, the flicker spectrum detecting unit 16, and the brightness estimating unit 17, but this is without limitation. For example, the imaging device may be provided with an illumination sensor and the illumination sensor estimates the light source brightness.

(8) According to each of the first to third embodiments described above, the FFT is used to detect a flicker spectrum value but this is without limitation. Any other scheme may be employed as long as the flicker spectrum value is duly detected.

(9) According to the first embodiment, the brightness correction coefficient corresponds to the frame brightness value and used for both the reference frame selection and the motion vector estimation. Yet, this configuration is merely an example and without limitation. The brightness correction coefficient corresponding to the frame brightness value may be used for only one of the reference frame selection and the motion vector estimation. Note that one of the above processes for which the brightness correction coefficient is not used is performed on assumption that the brightness correction coefficient is a fixed value "1", so that a conventional encoding technique is applied. By using the brightness correction coefficient for only one of the above processes, the encoding efficiency is reduced but the manufacturing cost is reduced, as compared with the case where both the process use the brightness correction coefficient.

(10) According to each of the first to third embodiments described above, the brightness value (Y) and the hue values (Cb and Cr) are used. However, this is merely one example and without limitation. For example, any data having a correlation with the brightness, such as RGB data and Bayer data may be usable in each of the first to third embodiments, directly or after applying predetermined conversion.

(11) According to each of the first to third embodiments described above, the CCD camera module 2 is described on the premise that the brightness value (Y) is to be calculated. Yet, this is illustrative only and without limitation. For example, similarly to any other general imaging device, the calculation of the brightness value (Y) may be performed by the image input unit 14. In such a case, although it becomes difficult to maintain the compatibility of the image input unit 14 with various types of image sensors, the cost is expected to be reduced.

(12) According to each of the first to third embodiments described above, the CCD camera module 2 is used but this is illustrative only and without limitation. For example, the CCD camera module 2 may be replaced by any of other imaging devices, such as a CMOS image sensor.

(13) The imaging devices 1, 1a, and 1b described in each of the first to third embodiments above may each be provided with a mechanism for switching between an encoding mode described in the corresponding embodiment and another encoding mode (a conventional encoding, for example) and also with a mode selection button that allows a user to select either mode.

Furthermore, the imaging devices 1, 1a, and 1b each may be provided with a mechanism for switching between an encoding mode described in the corresponding embodiment and another encoding mode (a conventional encoding, for example), depending on the frame rate at which video images are captured.

(14) The transmitters and receivers consistent with the embodiments above may each be realized as an LSI (Large Scale Integration), which is a type of integrated circuits. The individual circuits may be implemented on separate chips, or all or part of the circuits may be implemented on a single chip.

Although LSI is specifically mentioned herein, the same may also be referred to an IC (integrated circuit), a system LSI, a super LSI, or ultra LSI, depending on the packaging density.

The scheme employed for the circuit integration is not limited to LSI, and the integrated circuit may be implanted by a dedicated circuit or a general purpose processor. It is also possible to use an FPGA (Field Programmable Gate Array), which allows post manufacture programming of the LSI, or to use a reconfigurable processor, which allows reconfiguration of the connection between circuit cells within the LSI or setting of the circuit cells.

Furthermore, if the advance in the field of semiconductor technology or in another technology derived therefrom introduces a new integration technology that replaces the LSI, the new technology may be used to integrate the functional blocks. For example, the application of biotechnology is one possibility.

[Industrial Applicability]

The present invention is applicable to an imaging device for encoding video and having the function of detecting a fluorescent flicker spectrum. The present invention is especially usable for video devices, such as a digital video camera and a digital camera, having a high-speed image capturing function. The present invention is also applicable to LSI and the like for use in such an imaging device.

The invention claimed is:

1. An imaging device comprising:
an imaging unit;
a detecting unit operable to detect a time waveform indicating flicker of a light source;
an estimating unit operable to estimate, for each of a plurality of image frames and based on a result of the detection by the detecting unit, a brightness value of the light source as of a time at which the image frame is captured by the imaging unit;
a determining unit operable to determine, as a reference frame, one of a plurality of candidate reference frames based on the estimated brightness values of the light source; and
an encoding unit operable to encode a current image frame based on the reference frame determined by the determining unit.

2. The imaging device of claim 1, wherein
the determining unit is operable to determine, as the reference frame and from among the plurality of candidate reference frames, the candidate reference frame having an estimated brightness value closest to the estimated brightness value of the light source as of the time at which the current image frame to be encoded is captured by the imaging unit.

3. The imaging device of claim 1, wherein
the determining unit is operable to determine the reference frame, the candidate reference frame having a largest estimated brightness value of the light source from among the plurality of candidate reference frames.

4. An imaging device comprising:
an imaging unit;
a detecting unit operable to detect a time waveform indicating flicker of a light source;
an estimating unit operable to estimate, based on a result of the detection by the detecting unit, a brightness value of the light source as of a time at which each of a plurality of image frames is captured by the imaging unit;

a plurality of sub-encoding units operable to perform encoding in parallel;

a determining unit operable to determine, based on the estimated brightness values of the light source, one of the sub-encoding units to encode a current image frame; and a distributing unit operable to output the current image frame to the one of the sub-encoding units determined by the determining unit.

5. An integrated circuit comprising:

a detecting unit operable to detect a time waveform indicating flicker of a light source;

an estimating unit operable to estimate, for each of a plurality of image frames and based on a result of the detection by the detecting unit, a brightness value of the light source as of a time at which an image frame is captured by an imaging unit;

a determining unit operable to determine, as a reference frame, one of a plurality of candidate reference frames based on the estimated brightness values of the light source; and an encoding unit operable to encode a current image frame based on the reference frame determined by the determining unit.

6. An imaging method, comprising:

image capturing;

detecting a time waveform indicating flicker of a light source;

estimating, for each of a plurality of image frames and based on a result of the detection in said detecting, a brightness value of the light source as of a time at which the image frame is captured in said image capturing;

determining, as a reference frame, one of a plurality of candidate reference frames based on the estimated brightness values of the light source; and encoding a current image frame based on the reference frame determined in said determining.

\* \* \* \* \*